F. W. SUTHERLAND.
MACHINE FOR AND METHOD OF SEALING CARTONS.
APPLICATION FILED SEPT. 13, 1919.
1,359,546.
Patented Nov. 23, 1920.
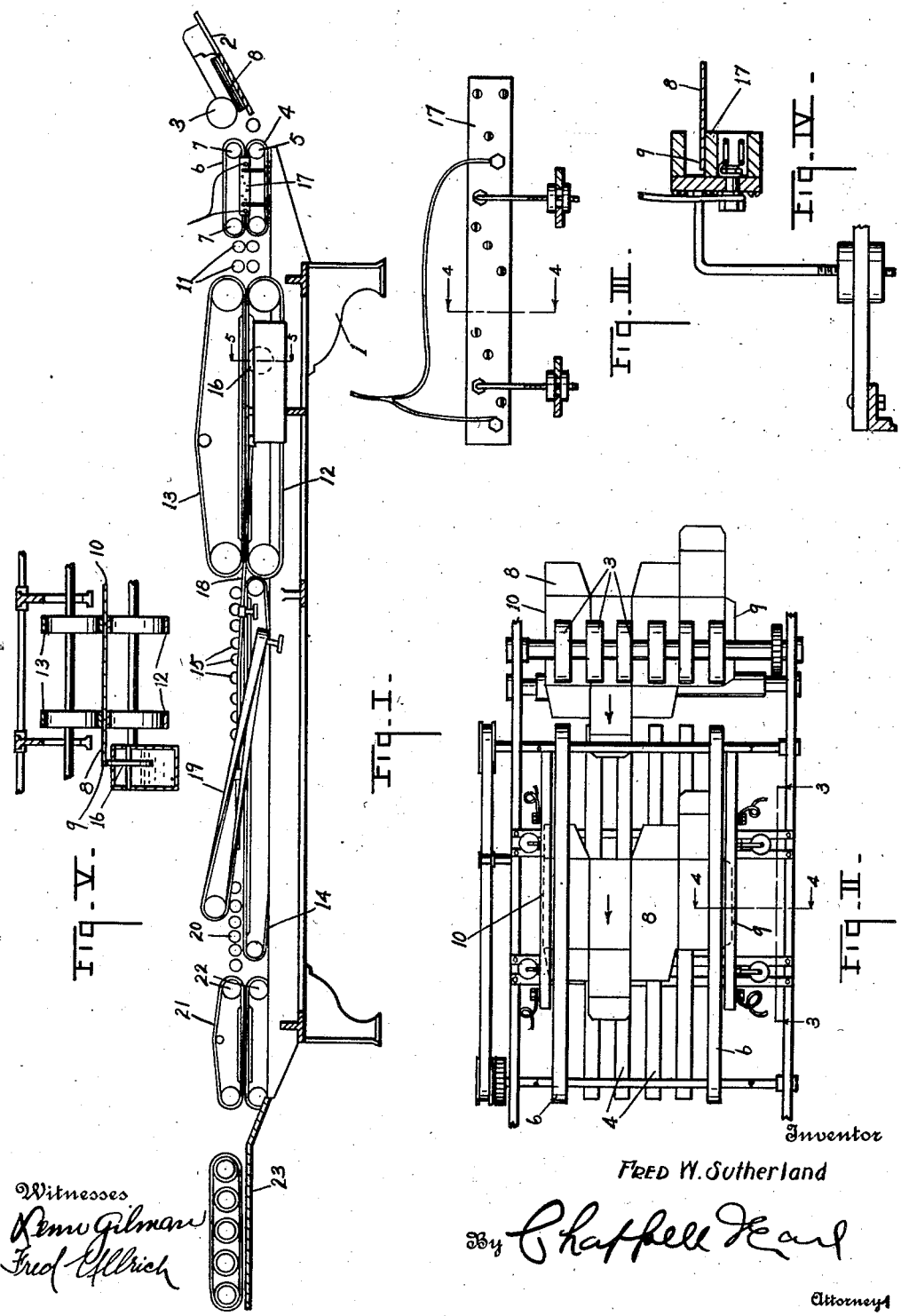
Witnesses
Inventor
Fred W. Sutherland
Attorneys

UNITED STATES PATENT OFFICE.

FRED W. SUTHERLAND, OF KALAMAZOO, MICHIGAN.

MACHINE FOR AND METHOD OF SEALING CARTONS.

1,359,546.  Specification of Letters Patent.  Patented Nov. 23, 1920.

Application filed September 13, 1919. Serial No. 323,585.

*To all whom it may concern:*

Be it known that I, FRED W. SUTHERLAND, a citizen of the United States, residing at the city and county of Kalamazoo, State of Michigan, have invented certain new and useful Improvements in Machines for and Methods of Sealing Cartons, of which the following is a specification.

This invention relates to improvements in machines for and methods of sealing cartons.

In the manufacture of cartons, it is desirable to use quick setting glues and also a minimum quantity of glue not only on account of the saving thereby effected but so that when the glued surfaces are pressed together, the glue will not exude at their edges as that injures the appearance of the carton and also such exuding glue may come into contact with the contents of the package or become detached and find its way into the food contained in the package or into other food as it is being prepared in the kitchen or the like.

Further, in the manufacture of cartons which have been previously water-proofed by the application of paraffin wax or the like, difficulty has been experienced in sealing the same. My present invention contemplates, in addition to the improvements in the manufacture of cartons other than water-proofed cartons, improvements in the manufacture of waxed or water-proofed cartons and is to that extent related to my invention illustrated and described in my application for Letters Patent filed April 20, 1919, Serial No. 293,795.

The main objects of this invention are:

First to provide an improved machine for sealing cartons by means of which the parts of the carton are effectively joined.

Second, to provide an improved method of sealing cartons.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail side elevation of a sealing machine embodying the features of my invention, portions of the frame being shown in vertical section and other parts of the mechanism being shown conventionally.

Fig. II is a detail plan view of the feed conveyer of my improved sealing machine.

Fig. III is a side view of one of the heating elements, its supports being in section on a line corresponding to line 3—3 of Fig. II.

Fig. IV is an enlarged detail vertical section on a line corresponding to line 4—4 of Figs. II and III.

Fig. V is a detail transverse section on a line corresponding to line 5—5 of Fig. I showing details of the glue applying mechanism.

In the drawing similar reference characters refer to similar parts throughout the several views, and the sectional views are taken looking in the direction of the little arrows at the ends of the section lines.

Referring to the drawing, 1 represents the frame of my machine, at the front of which is a hopper 2 having delivery rollers 3. These rollers deliver the cartons successively to the feed conveyer comprising, in the machine illustrated, a plurality of supporting belts 4 carried by pulleys 5, and a pair of upper presser belts 6 supported by rollers 7. This feed conveyer carries the cartons 8 along with their edges 9 and 10 projecting at the sides of the outer feed belts. The edge 9 is the sealing flap which is adapted to be lapped upon the opposite edge 10.

The cartons are delivered from the feed conveyer through the rollers 11 to the sealing conveyer consisting of coacting belts 12 and 13, and the belt 14 and coacting rollers 15. As the cartons are carried along by the belts 12 and 13, they are brought into contact with the glue roller 16 which applies the glue thereto.

To prepare the surfaces to receive the glue and insure a secure joint by a quick setting and a minimum quantity of glue and to enable the passing of the cartons through the machine at a high speed, or where previous waxed cartons are to be sealed, to remove or drive off a substantial portion of the wax from the surface to be glued together thereby enabling the effective gluing of the same, I provide plate-like heating elements 17 positioned at the sides of the feed conveyer so that the surfaces to be glued together or the projecting portions 9 and 10 pass across the same. Where the cartons have been previously waxed, this drives off or removes a greater portion of the wax and heats the surfaces so that the glue is most effective. In unwaxed cartons this heating is of very great advantage as it enables the use of certain desirable quick setting adhesives and the cartons are very effectively sealed. The glue is applied and the surfaces pressed together while the surfaces are still heated. It is found that the glue has "taken hold" of the surfaces more securely and that the sealing is more secure as a result of this heating. Further, the use of such glues, and I use the term "glue" in its comprehensive sense, enables the speeding up of the machine, that is, it is not necessary to allow so much time for the glue to set while under pressure.

The flap closing and pressing means is arranged close to the gluing mechanism and comprises, in the structure illustrated, rod-like folder members 18 and the turning belts 19, portions of the cartons being turned by the rods 18 and further turned by the belts 19 until they pass under the rollers 20 from which they pass between the presser belts 21 and 22 to the discharge table 23. It will be understood that the rods 18 and the belts 19 are in pairs. The details of the flap turning and folding means form no part of this invention and are, therefore, shown conventionally, the same being illustrated with somewhat further detail in my application for Letters Patent referred to.

The heating unit 17 illustrated is an electrically heated unit. It will be understood that it may be heated by gas, steam or otherwise, but the electrically heated units are very desirable on account of the ease with which they may be controlled or the uniform temperature maintained.

I have not attempted to illustrate or describe certain embodiments or adaptations which I contemplate as I believe the disclosure made will enable those skilled in the art to which my invention relates to embody or adapt the same as may be desired.

Having thus described my invention, what I claim as new and desire to secure by Letters Patent, is:

1. In a machine for sealing cartons, having a sealing flap at one edge adapted to be lapped upon the opposite edge, the combination of a carton feeding means comprising pairs of opposed belts between which the carton is carried in the flat with its sealing flap and its edge upon which the flap is to be lapped projecting at the sides of the belts, hot plates with which the glue receiving surface of the projecting sealing flap and the coacting projecting surface at the opposite edge of the carton contact while the cartons are supported by said belts, a sealing conveyer, a glue roll disposed at the side of said sealing conveyer to apply glue to the sealing flap as the carton is carried along by the conveyer, and means at the rear of said glue roller for folding the carton with its glued flap and coacting surface lapping.

2. In a machine for sealing cartons having a sealing flap at one edge adapted to be lapped upon the opposite edge, the combination of a carton feeding means comprising pairs of opposed belts between which the carton is carried in the flat with its sealing flap and its edge upon which the flap is to be lapped projecting at the sides of the belts, hot plates across which the glue receiving surface of the projecting sealing flap and the coacting projecting surface at the opposite edge of the carton are carried while the cartons are supported by the belts, and means for applying glue to said flap and folding the carton with its glued flap and coacting surface lapping.

3. In a machine for sealing cartons, the combination of a carton feeding means comprising pairs of opposed belts between which the carton is carried in the flat with its surfaces adapted to be glued together projecting at the sides of the belts, means for heating such surfaces, a sealing conveyer, a glue applying means at the rear of said heating means, and means at the rear of said glue applying means for folding the carton.

4. In a sealing machine, the combination of a carton conveyer adapted to carry a carton in the flat with its surfaces adapted to be glued together projecting at the sides of the conveyer, means for heating such surfaces as the cartons are carried along by the conveyer, and means for applying glue and folding the carton while the surfaces are heated, for the purpose specified.

5. In a sealing machine, the combination of a carton conveyer adapted to carry a carton with its surfaces adapted to be glued together exposed, means for heating such surfaces, and means for applying glue and folding the carton while such surfaces are heated, for the purpose specified.

6. In a machine for sealing cartons, the combination of a carton conveying means, means for heating the surfaces to be glued together, and means for applying glue and folding the carton while the surfaces are heated.

7. In a machine for sealing cartons, the combination of a carton conveying means, means for bringing the surfaces adapted to be glued together into contact with heating plates, and means for applying glue and folding the carton while such surfaces are still heated.

8. The method of sealing cartons consisting of heating the surfaces to be glued together by bringing into contact with a heating plate and applying glue to such surfaces and pressing them together while heated.

9. The method of sealing cartons consisting of heating the surfaces to be glued together, applying glue and pressing such surfaces together while they are heated.

10. In a machine for sealing waxed cartons, the combination of a carton conveying means, means for heating the surfaces to be glued together to soften the wax comprising heating plates across which such portions of cartons are carried, and means for applying the glue and folding the cartons.

11. In a machine for sealing waxed cartons, the combination of a carton conveying means, means for removing or driving off a substantial portion of the wax from the surfaces to be glued together comprising heating plates with which such surfaces are brought into contact, and means for applying the glue and folding the cartons.

12. The method of sealing waxed cartons consisting of removing or driving off a substantial portion of the wax from the surfaces to be glued together by contacting with heating plates, applying glue thereto, and pressing such surfaces together.

In witness whereof I have hereunto set my hand and seal in the presence of two witnesses.

FRED W. SUTHERLAND. [L. S.]

Witnesses:
ADRIAN J. VANDERLINDE,
NED DOYLE.